Patented Feb. 6, 1934

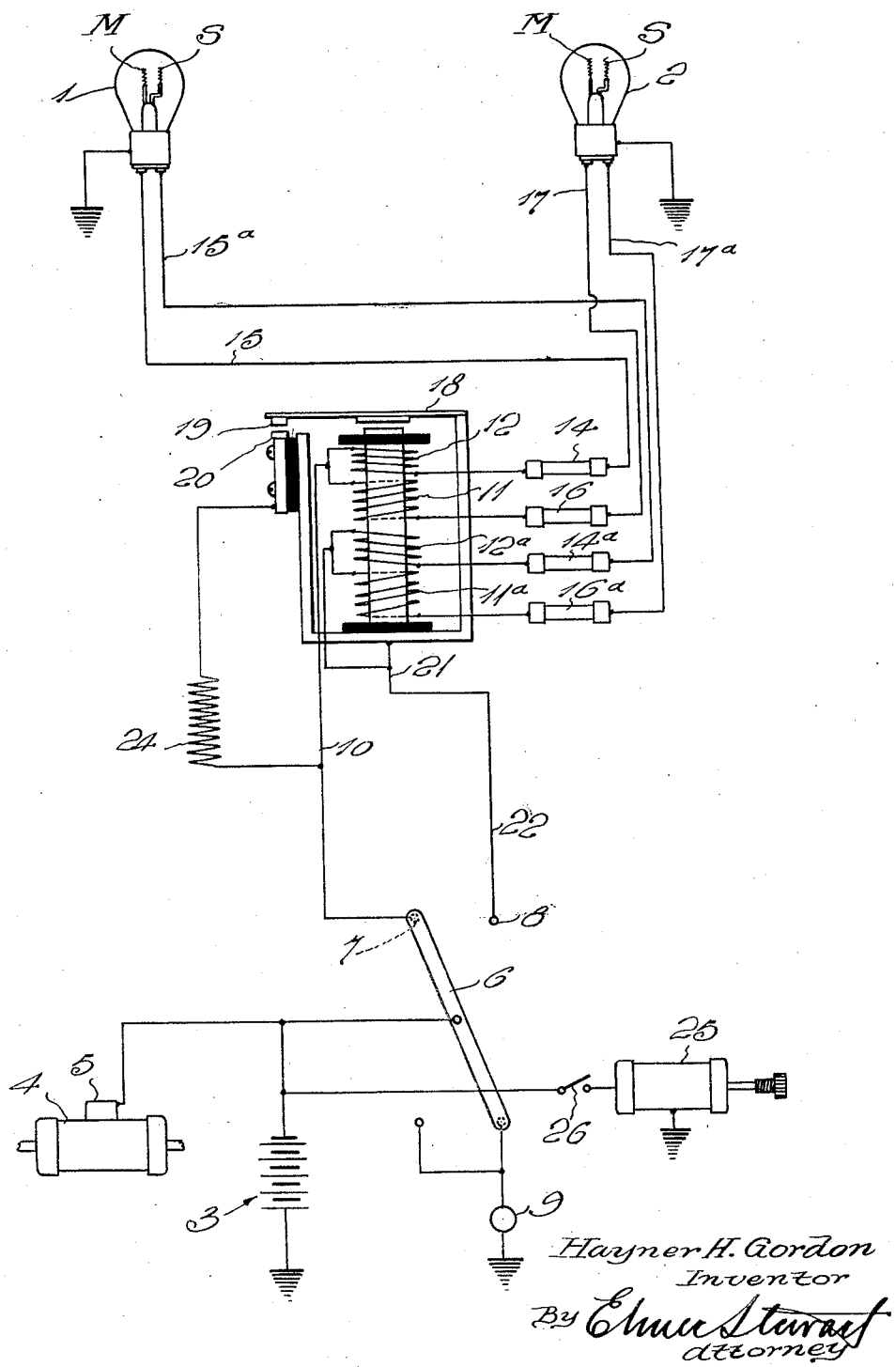

1,945,528

UNITED STATES PATENT OFFICE 1,945,528

LIGHTING SYSTEM FOR AUTOMOTIVE VEHICLES

Hayner H. Gordon, Washington, D. C., assignor, by direct and mesne assignments, to Lite Watchman Corporation, New York, N. Y., a corporation of Delaware Application May 3, 1930. Serial No. 449,657

12 Claims. (Cl. 171—97)

The present invention relates to electrical lighting systems for automotive vehicles and is more particularly directed to an automatic safety device associated with the front lights of automotive vehicles.

When driving it is quite common to see automobiles with only one headlight burning, of which fact the operator of the vehicle is usually unaware. In other instances, the driver may be aware that but one headlight is operating, but he may not be possessed of the tools to remove the front of the lamp or a new bulb to insert in lieu of the burned out one.

Driving under these conditions is dangerous both to the driver of this vehicle and to the drivers of approaching vehicles, as it is impossible to tell whether the one light signifies the approach of a motor-cycle or a car, and it is of course impossible to ascertain whether it is the right hand headlight or left hand headlight which is burning, and therefore impossible to determine or gauge the amount of clearance to be given the approaching vehicle.

It is an object of the present invention to provide an automatic safety control for the electric lighting system of automotive vehicles which will automatically provide at all times for the forward projection of light rays from a pair of lights located at the front of the vehicle.

It is a further object of the present invention to provide an arrangement of circuits having an automatic electric control of such nature that when either one of the headlight lamps of an automotive vehicle is extinguished, either through failure of one of the lamp filaments or a short-circuiting of its supply circuit, a second lighting circuit will be energized, which energization will cause the projection of light rays from a pair of lights.

In my co-pending application, Serial #433,367, for lighting system for automotive vehicles, the invention set forth and claimed therein had reference to an auxiliary lighting system automatically caused to function by a failure of either one of the bulbs in the main system. The invention set forth therein comprehended the use of multiple filament bulbs, and the present invention relates in part to various circuits in which lamp bulbs of this character are utilized.

It is a further object of the present invention to provide, in conjunction with an automobile headlight system using double filament bulbs, a system whereby the second set of filaments is automatically supplied with energy when either of the other filaments in the bulb burn out or a short circuit occurs in the lamp leads.

Other objects will appear from the following detailed description of this invention, the present embodiments being selected for the purpose of illustrating and describing the same:

The single figure of the accompanying drawing discloses in diagrammatic form an automotive electric lighting system illustrative of the present invention.

Referring to the drawing, 1 and 2 represent respectively the right and left hand headlight bulbs of an automotive vehicle. The form of bulb illustrated is that employing the double filament of equal candlepower or strength, this type of bulb utilizing a main filament in the focus of the bulb indicated by the reference letter M and a supplemental filament of equal intensity of candlepower indicated by the reference letter S. These lights are adapted to supply it with energy from the storage battery 3 and the engine driven generator 4 connected to the battery through the conventional cutout 5. The filaments M and S are normally selectively energized by means of a lighting switch lever 6 having its upper end adapted to contact with switch studs 7 and 8. When the switch lever is in contact with the stud 7, filaments M in lights 1 and 2 are energized and when the switch lever 6 is in contact with the stud 8 filaments S are energized. At the same time the switch lever 6 functions to suitably energize a tail light 9, the return to the battery from the various lights being through the ground connections illustrated. When the switch contact lever 6 is on stud 7 the current for the energy supply to the filaments M passes through lead 10 to windings 11 and 12 on the relay core 13. These windings have the same number of turns and are wound on the core 13 so that their magnetic effects are in opposition with normal current flow to the lamps through windings 11 and 12. From winding 12 the current passes to filaments M in lamp 1 through fuze 14 and lead 15, while current for filaments M of lamp 2 passes through fuze 16 and lead 17. It should be understood that the fuzes 14 and 16 should be located as closely as possible to the windings 11 and 12, and these fuzes which are of conventional or standard construction may preferably be mounted upon the base or cover of the relay structure. The relay is provided with an armature 18 carrying a contact 19 adapted to cooperate with a contact 20, the armature being normally biased so that these contacts are open.

The storage battery 3, in addition to supplying energy for the lighting circuits, supplies energy to a starting motor 25 through the medium of a switch 26, and also to an ignition circuit, not illustrated.

Windings 11a and 12a are wound to oppose each other with the same number of turns and have their common ends connected through lead 22 to switch contact stud 8. The outer ends of these windings are connected to filaments S through leads 15a and 17a. Lead 22 is grounded to the frame of the relay by lead 21, and the fixed contact 20 which cooperates with armature contact 19 is connected to lead 10 through the resistance 24. It is to be of course understood that the use of the resistance 24 is not essential to the broad application of the principles involved, nor would the same be necessary where double filament bulbs having filaments of 21 and 2 candlepower, respectively, are used.

The operation is as follows:

When switch contact is on 7 and the lamps are in normal operation filaments M are energized through relay windings 11 and 12. When switch lever 6 is on contact stud 8 the filaments S in lamp bulbs 1 and 2 are similarly energized through windings 11a and 12a. During normal energization of either set of filaments, no resultant magnetic flux is set up in the relay core 13. If, however, when the switch lever is on contact stud 7 and the filaments M are energized, one of them should burn out or fuze 14 or 16 should blow out because of a short circuit, current flow through the winding of the relay associated with that particular circuit would cease. Resultant magnetic flux would then be set up in the core and armature 18 would be actuated, closing contacts 19 and 20, thereby connecting lead 10 to lead 22 through resistance 24, which would cause the S filaments in lamps 1 and 2 to undergo low-voltage energization. Similarly, if the switch lever 6 is in contact with stud 8 energizing filaments S in lamps 1 and 2, and either of these filaments burn out or fuze 14a or 16a blows out, windings 12a and 11a become unbalanced with consequent actuation of armature 18 and closing of contacts 19 and 20. This in turn would cause consequent low voltage energization of filaments M in the manner heretofore described.

In the forms of the invention illustrated I employ what may be termed a zero state of flux in the core 13 of the relay and the armature is more easily and more positively actuated with a minimum degree of accuracy of bias than would be the case with merely a change in the amount of flux. It will also be noted that in such a system as has been described voltage or current variations in the system will not in any way affect the operation of the relay, as the balanced opposing windings will be equally subjected to such variations.

While the invention has been described in connection with double filament lamps, it is of course to be understood that in its broadest aspect it may be utilized with separate bulbs, as disclosed in my co-pending application, Serial No. 433,367, of which this application is a continuation in part.

It is to be understood that the embodiments of the invention which have been shown and described may be varied in substantial detail therefrom without departing from the spirit of the invention as defined in the accompanying claims.

What I claim is:

1. An electrical lighting system for automotive vehicles including in combination two lighting systems capable of separate energization, a source of electrical energy, manually operable switching means for selectively connecting said source of energy to either of said lighting systems, automatic switching means having a circuit associated therewith to connect said lighting systems in parallel, and means for operating said automatic switching means dependent for functioning upon a partial cessation of flow of energy in either of said lighting systems.

2. An electrical lighting system for automotive vehicles including in combination two separate lighting systems, a source of electrical energy, manually operable switching means for selectively energizing either of said lighting systems from said source of energy; automatic switching means having a circuit associated therewith to connect said lighting systems in parallel incorporating a resistance, in one of said systems and means for operating said automatic switching means dependent for functioning upon a partial cessation of flow of energy in either of said lighting systems.

3. An electrical lighting system for automotive vehicles including in combination a main lighting system including a plurality of light sources, a supplemental lighting system, a source of electrical energy, manually operable switching means for connecting said source of energy to each of said lighting systems, automatic switching means having a circuit associated therewith to supply energy from said source to either of said lighting systems, when said manually operable switching means is positioned to connect one of said lighting systems to said source, and electromagnetic means for operating said automatic switching means dependent for functioning upon a substantial decrease of the current flow in either of said light sources in the energized system.

4. An electrical lighting system for automotive vehicles including in combination a main lighting system comprising two light sources, a supplemental lighting system comprising a plurality of light sources, a source of electrical energy, manually operable switching means for connecting said source of energy to each of said lighting systems through a separate circuit, automatic switching means having a circuit associated therewith to supply energy from said source to either of said lighting systems when said manually operable switching means is positioned to connect one of said lighting systems with said source, electromagnetic means including windings in series with said lighting systems for operating said automatic switching means upon cessation of current flow in one of said light sources in the energized system, and circuit opening devices intercalated in said main lighting system between said windings and lights.

5. An electrical system for vehicles including in combination, a plurality of lamps each having a main lighting filament and a supplemental lighting filament; a source of energy; circuit connections from said source of energy to said main and supplemental filaments; manually controlled switching means for selectively establishing a flow of energy from said source of energy to said main or supplemental filaments; a unitary automatic connecting means associated with said circuit connections for establishing an energy flow to either of said filaments independent of the flow of energy established by said manual controlled switching means; said automatic means dependent for function upon the failure of the energy flow to a lighting filament connected to the source of energy by said manually controlled means.

6. An electrical system for vehicles including in combination, a plurality of lamps each having a main lighting filament and a supplemental lighting filament; a source of energy; circuit connections from said source of energy to said main and supplemental filaments; switching means for selectively establishing a flow of energy from said source of energy to said main or supplemental filaments; a unitary automatic controlling means associated with said circuit connections for establishing an energy flow at less than normal voltage to either of said filaments independent of the flow of energy established by said manual controlled switching means, said automatic means dependent for function upon the failure of the energy flow to a lighting filament connected to the source of energy by said switching means.

7. An electrical system for vehicles including in combination, a plurality of lighting systems capable of separate energization, each system including a plurality of light sources; means operable for selectively causing the energization of said lighting systems from a source of electrical energy; automatic means for establishing an energy flow to said systems independent of the flow of energy established by said selective means; said automatic means depending for function upon the failure of the flow of energy in a portion of the lighting system selectively connected with a source of electrical energy.

8. An electrical system for vehicles including in combination two lighting systems capable of separate energization; each system comprising two sets of lighting filaments and circuit connections therefor; means for selectively causing the energization of said lighting systems from a source of electrical energy; switching means having a circuit associated therewith for connecting both of said lighting systems in parallel to a source of energy independent of the flow of energy established by said selective means; and means intercalated in said systems and in series with said lighting filaments for operating said switching means dependent for functioning upon the failure of the circuit connections of one of said filaments.

9. An electrical system for vehicles including in combination, two lighting systems capable of separate energization, each system comprising a pair of headlights each having two lighting filaments; a source of electric energy; manually operable switching means for selectively causing the energization of said lighting system from said source of energy; electro-magnetic responsive means for establishing an energy flow to either of said systems independent of the flow of energy established by said selective means; said electro-magnetic means depending for function upon the failure of the flow of energy to a lighting filament of the lighting system selectively connected with the source of energy.

10. In electrical lighting for automotive vehicles, in combination, two lighting systems capable of separate energization; a source of electrical energy; switching means for selectively connecting said source of energy to either of said lighting systems; a circuit for connecting the normally disconnected lighting system to the source of energy; a switch adapted to be automatically operated to control the energization of said circuit and electro-magnetic means for operating said last mentioned switch automatically dependent for functioning upon a partial cessation of the flow of energy in either of said lighting systems.

11. In a lighting system for automobiles, one or more headlamps, an electric lamp-bulb for each of said headlamps, said lamp-bulb having two filaments to produce headlight beams of different characters, a source of current for said filaments, a control switch for selectively connecting said filaments to said current-source, and means operative upon the interruption of the supply of current to one filament when such filament is connected to said current-source by said switch for connecting the other filament to said current-source.

12. In combination, two main electrical circuits, a source of current, switch means for selectively connecting said current source in said main circuits, a current-consuming device in each main circuit, and means operative upon the interruption of the supply of current to one current-consuming device when it is connected to the current-source by said switch for connecting the other current-consuming device to said current-source.

HAYNER H. GORDON.